United States Patent
Smith et al.

(10) Patent No.: US 7,460,836 B2
(45) Date of Patent: Dec. 2, 2008

(54) METHOD AND SYSTEM FOR PROVIDING ADAPTIVE PROBE REQUESTS

(75) Inventors: Brian K. Smith, Wellington, FL (US); Floyd D. Simpson, Lake Worth, FL (US)

(73) Assignee: Motorola, Inc., Schaumburg, IL (US)

(*) Notice: Subject to any disclaimer, the term of this patent is extended or adjusted under 35 U.S.C. 154(b) by 415 days.

(21) Appl. No.: 10/660,066

(22) Filed: Sep. 11, 2003

(65) Prior Publication Data
US 2005/0059353 A1    Mar. 17, 2005

(51) Int. Cl.
*H04B 17/00* (2006.01)
(52) U.S. Cl. .................... 455/67.11; 455/41.2; 455/502
(58) Field of Classification Search ............... 455/41.2, 455/67.11, 502, 517–519; 370/338, 350, 370/445, 503, 252–253, 524, 528
See application file for complete search history.

(56) References Cited

U.S. PATENT DOCUMENTS 6,980,535 B2 * 12/2005 Bennett ....................... 370/331
2004/0264413 A1 * 12/2004 Kaidar et al. ............... 370/332

OTHER PUBLICATIONS

IEEE-SA Standards Board, ANSI/IEEE Std 802.11, 1999 Edition (R2003), Part 11: Wireless LAN Medium Access Control (MAC) and Physical Layer (PHY) Specifications - Section 11.1.3, pp. 125-127 (4 pages including cover sheet).

* cited by examiner

*Primary Examiner*—Edward Urban
*Assistant Examiner*—Raymond S. Dean

(57) ABSTRACT

A method of providing RF signal quality information which includes the step of a probe request generator (110) monitoring a channel for probe requests being transmitted by a station (115) and/or probe responses being transmitted by an access point (105). The probe request generator can determine a time period between the successive probe request transmissions received from the station or successive probe responses received from the AP. The probe request generator can generate a series of probe requests (150) having the determined time period between successive probe request transmissions. The series of probe requests signal an access point (105) to transmit probe responses (155) which are detectable by the station.

17 Claims, 5 Drawing Sheets

METHOD AND SYSTEM FOR PROVIDING ADAPTIVE PROBE REQUESTS

CROSS-REFERENCE TO RELATED APPLICATIONS

Not applicable

FIELD OF THE INVENTION

This invention relates to radio communications, and more particularly to radio communication protocols.

BACKGROUND OF THE INVENTION 802.11 is a family of specifications for wireless local area networks (WLAN's) developed by a working group of the Institute of Electrical and Electronics Engineers (IEEE). There are currently four specifications in the family: 802.11, 802.11a, 802.11b, and 802.11g. All four use the Ethernet protocol and carrier sense multiple access with collision avoidance (CSMA/CA) for path sharing.

Within the 802.11 specifications, stations, for example mobile communication devices, can receive beacon frames from an access point to provide protocol and signal quality information. If, however, the beacon frame transmission rate is not sufficient, the stations can enter an active scan mode whereby the stations transmit probe requests to the access point. The probe requests signal the access point to transmit probe responses which provide protocol and signal quality information. Such an active scanning mechanism is described in §11.1.3 of the IEEE 802.11 specification.

There are disadvantages associated with a station operating in the active mode and sending probe requests. Notably, much overhead traffic is generated when multiple stations each generate probe requests and an access point transmits a probe response for each probe request. Further, the transmission of probe requests and additional channel sensing while contending for a channel is energy intensive. Consequently, the transmission of probe requests by a station decreases the station's battery life. Thus, what is needed is a solution such that a station can receive probe responses without the need for the station to continually transmit probe requests.

SUMMARY OF THE INVENTION

An embodiment in accordance with the present invention relates to a method of receiving RF signal quality information. At a first station a plurality of probe responses can be received over a channel. The probe responses can be transmitted in reply to probe requests generated by a second station. A current transmit rate of the probe responses can be determined and signal processing can be synchronized to the current transmit rate. For example, the start of channel monitoring can be delayed so that the channel monitoring is synchronized with the probe responses. The probe responses can be processed to determine a signal quality of the channel or a transmission protocol being used over the channel. If a probe response is not received for a predetermined period of time, the first station can generate a probe request.

In another embodiment, a method of providing RF signal quality information includes the step of a probe request generator monitoring a channel for probe requests being transmitted by a station. The probe request generator can determine a time period between the successive probe request transmissions received from the station. The probe request generator can generate probe requests having the determined time period between successive probe request transmissions. The series of probe requests signal an access point to transmit probe responses which are detectable by the station.

The transmission of probe requests from the probe request generator can be halted or continued based upon detection of additional probe requests transmitted from stations other than the probe request generator. A time value and a medium access control address correlating to each of the probe requests can be stored. For example, each of the probe requests can be parsed and the medium access control address can be used to identify successive probe request transmissions from a particular station.

Further, the channel can be monitored for probe requests being transmitted by a second station. A second time period can be determined between the successive probe request transmissions from the second station. A second series of probe requests having the second determined time period can be transmitted. The second series of probe requests can signal the access point to transmit probe responses which are detectable by the second station.

A channel can also be monitored for probe responses being transmitted by an access point. A time period can be determined between successive probe response transmissions. A plurality of probe requests can be transmitted having the determined time period between successive probe response transmissions. The probe request generator can signal an access point to transmit probe responses which are detectable by a station. The transmission of probe requests from the probe request generator can also be halted. Further, the channel can be monitored for additional probe responses. Upon detection of additional probe responses, the transmission of probe requests from the probe request generator can be continued. A time value correlating to each of the probe responses can be stored.

In another embodiment in accordance with the present invention, a device for generating probe requests can include a probe request processor which receives probe requests generated by a station and determines a time period between successive probe requests. Further included are a probe request timing database which stores time stamps associated with the probe requests and a probe request scheduler which schedules probe request transmissions at intervals correlating to the determined time period between the received probe requests. The probe request transmissions can signal an access point to transmit probe responses which are detectable by the station. At least one probe request timer operatively communicating with the probe request scheduler and timing the probe request transmissions can be included. Further, a clock can be included which operatively communicates with the probe request processor to provide a current time value for each of the received probe requests. Finally, the device can include a radio for transmitting and receiving RF signals containing probe requests, a baseband processor operatively coupled to the radio and a medium access controller operatively coupled to the baseband processor.

In yet another embodiment, a system for synchronizing a radio transceiver to a wireless local area network can include a first receiver for receiving a plurality of probe responses over a channel in response to at least one probe request and a processor in the radio transceiver. The processor can be programmed to initiate a probe request if no probe responses are detected at the first receiver, stop further probe requests if probe responses in response to probe requests from another device are received at the radio receiver, and synchronize to at least one among probe requests from another device and probe responses in response to probe requests from another device. The plurality of probe responses can be transmitted to the radio receiver from a wireless access point that can couple to a local area network or other type of network.

DETAILED DESCRIPTION OF THE DRAWINGS

An embodiment in accordance with the present invention relates to a method and an apparatus for providing channel information to stations, such as a wireless communication device, via probe responses. In particular, the probe responses can be transmitted from an access point (AP) to the stations in response to a probe request that is transmitted by a probe request generator. Thus, multiple stations can receive probe responses from the AP without transmitting a station specific probe request for each probe response that will be received. Accordingly, the stations can save much of the energy that would otherwise be spent contending for a channel and transmitting probe requests, thereby extending the battery life of the stations. Moreover, since multiple stations can receive probe responses triggered by a single probe request generator, overhead traffic associated with a particular AP can be minimized.

Figure 1:
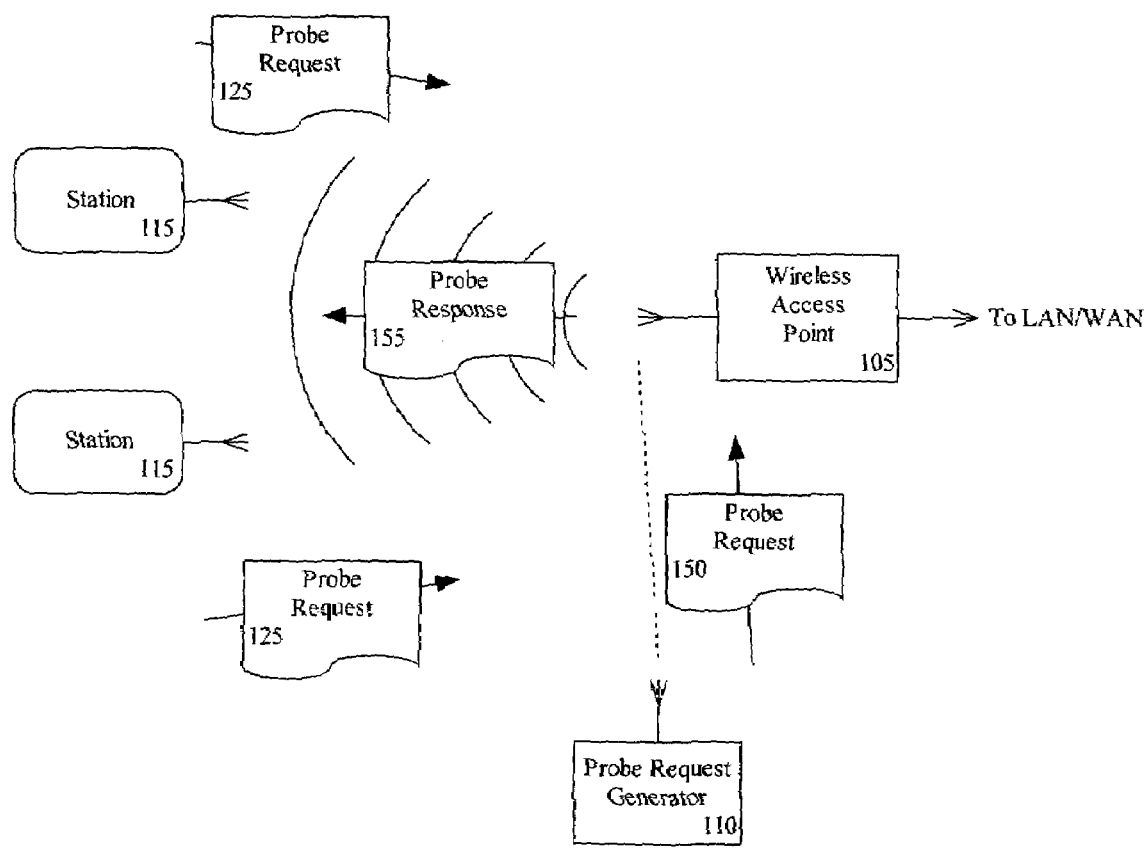
FIG. 1 is an exemplary schematic diagram of a wireless communication system incorporating an adaptive probe request generator in accordance with the inventive arrangements disclosed herein.

Referring to FIG. 1, an exemplary schematic diagram is shown of a wireless communication system 100 incorporating a wireless access point (AP) 105, a probe request generator 110, and stations 115. The stations 115 can be any wireless communication devices suitable for communicating with the AP 105 and one or more of the stations 115 can transmit probe requests 125 to the AP 105. For example, the stations can be mobile communications devices, such as personal digital assistants (PDA's), mobile computers, or any other suitable communication device which can be wirelessly connected to a network as a network node.

The AP 105 can be a wireless communications device which provides wireless access to a local area network (LAN), a wide area network (WAN), a wireless personal area network (WPAN), the Internet, or any other network. Such AP's are known to the skilled artisan. For example, the AP 105 can communicate with stations 115 using Bluetooth and/or a protocol from the Institute of Electrical and Electronics Engineers (IEEE) 802.11 family of protocols. Nonetheless, the invention is not so limited and the AP 105 can communicate with the stations 115 using any other suitable protocol.

In one arrangement, the probe request generator 110 can be a station, for example another station operating within an operational range of the AP 105. In another arrangement, the probe request generator 110 can be an adaptive probe request generator (APRG) specifically tasked with generating probe requests. The APRG can be a stand alone device, incorporated into the AP 150, or incorporated into another device. In operation, the probe request generator 110 can transmit one or more probe requests 150 to the AP 105. The probe requests 150 can be the same or essentially the same as the probe requests 125 from the stations 115. In response to the probe requests 150 or probe requests 125, the AP 105 can transmit probe responses 155 which are detectable by stations 115. The stations 115 can be predisposed to detect and synchronize with the probe responses 155.

Figure 2:
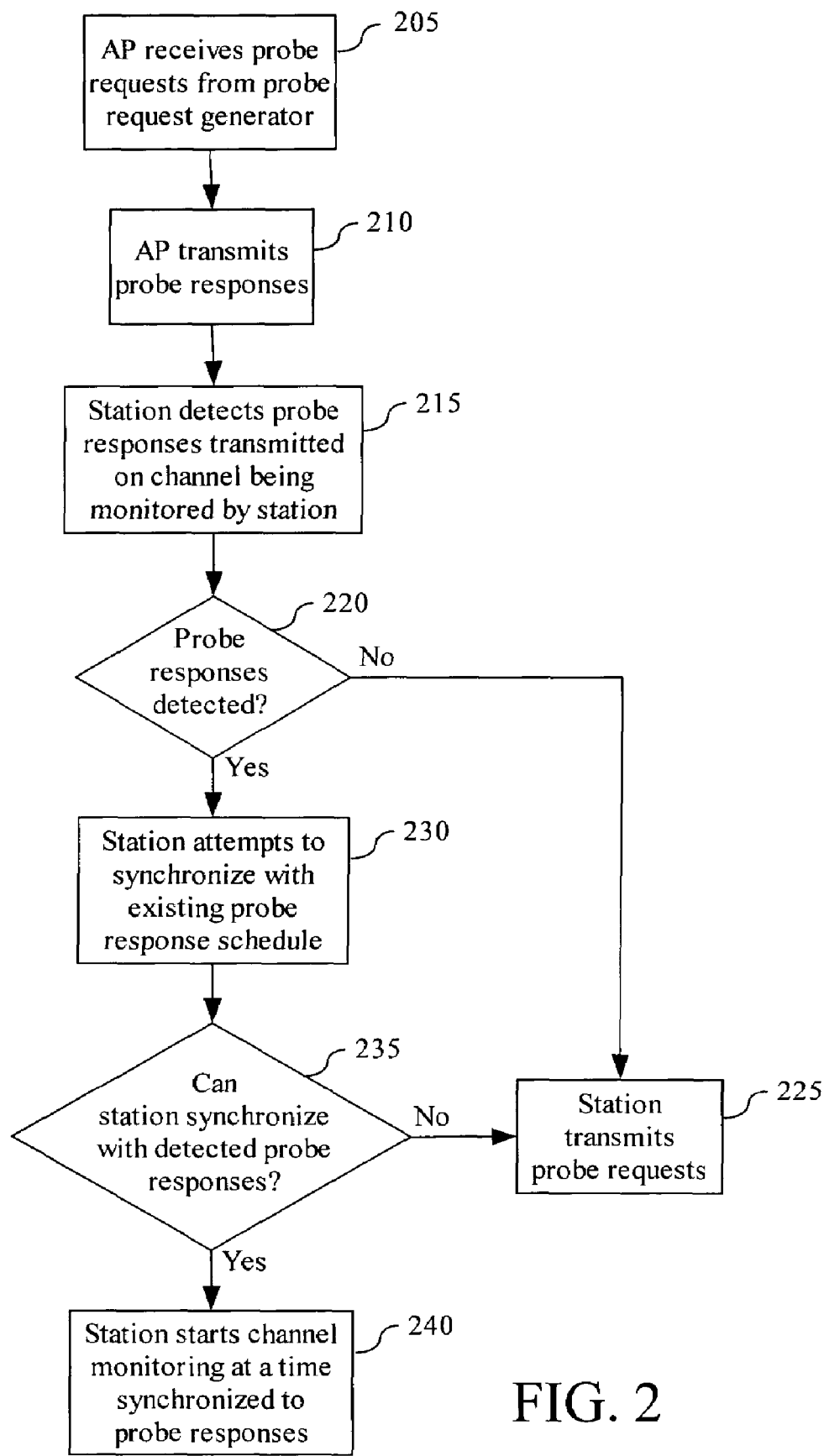
FIG. 2 is a flow chart illustrating a method of a station receiving probe responses from an access point in accordance with the inventive arrangements disclosed herein.

FIG. 2, a flow chart is shown which illustrates a method 200 of a station receiving probe responses from the AP 105 without transmitting a station specific probe request for each probe response that will be received. Referring both to FIG. 1 and FIG. 2, the AP can receive probe requests from the probe request generator, as shown in step 205. As noted, the probe request generator 110 can be an APRG, or a station operating within the operational area of the AP 105. In the case that an APRG is present, but the APRG has not yet adapted to a station's probe request schedule, the station 115 can generate the probe requests until the APRG has adapted to the probe request transmissions being generated by the station 115. Proceeding to step 210, the probe requests can trigger the AP 105 to transmit probe responses which can be detectable by stations 115. For instance, the probe responses can be transmitted on a channel being monitored by the stations 115. The probe responses can be used by the stations 115 to determine characteristics of a signal being transmitted over the channel. For example, the probe responses can be used to determine the signal quality of the channel and/or a transmission protocol being used over the channel. Continuing to step 215, stations entering the operational range of the AP 105 can detect probe responses which are being transmitted by the AP 105. Referring to decision box 220 and step 225, if the stations 115 do not detect the probe responses, the stations can transmit probe requests to signal the AP 105 to transmit probe responses that will be detectable by the stations 115.

If the stations 115 can detect the probe responses, the stations 115 can attempt to synchronize with the existing probe response schedule, as shown in step 230. Referring to decision box 235 and step 225, if the stations 115 cannot synchronize with the existing probe response schedule, the stations can transmit probe requests, thereby signaling the AP 105 to transmit probe responses on a schedule determined by the stations. For example, the stations can transmit probe requests if the AP 105 is currently transmitting probe responses at a transmission rate that is not adequate for the stations 115. If, however, the stations can synchronize to the existing probe response schedule, the stations can start channel monitoring, as shown in step 240. In particular, the stations 115 can perform a sliding correlation using desired and actual probe response transmission rates. For example, if the desired and actual probe response transmission rates are the same, the stations 115 can begin channel monitoring at a time which is synchronized with the timing of probe response transmissions. In particular, a station can delay a start of channel monitoring by an amount of time which is necessary for synchronization. In the case that a station 115 requires more probe responses than the AP 105 is currently generating, the station 115 can continue transmitting probe requests until the probe request generator 110 adapts to the station's probe request transmission schedule. It also should be noted that the probe request generator 110 can also serve as a station within contemplation of the present invention.

Figure 3:
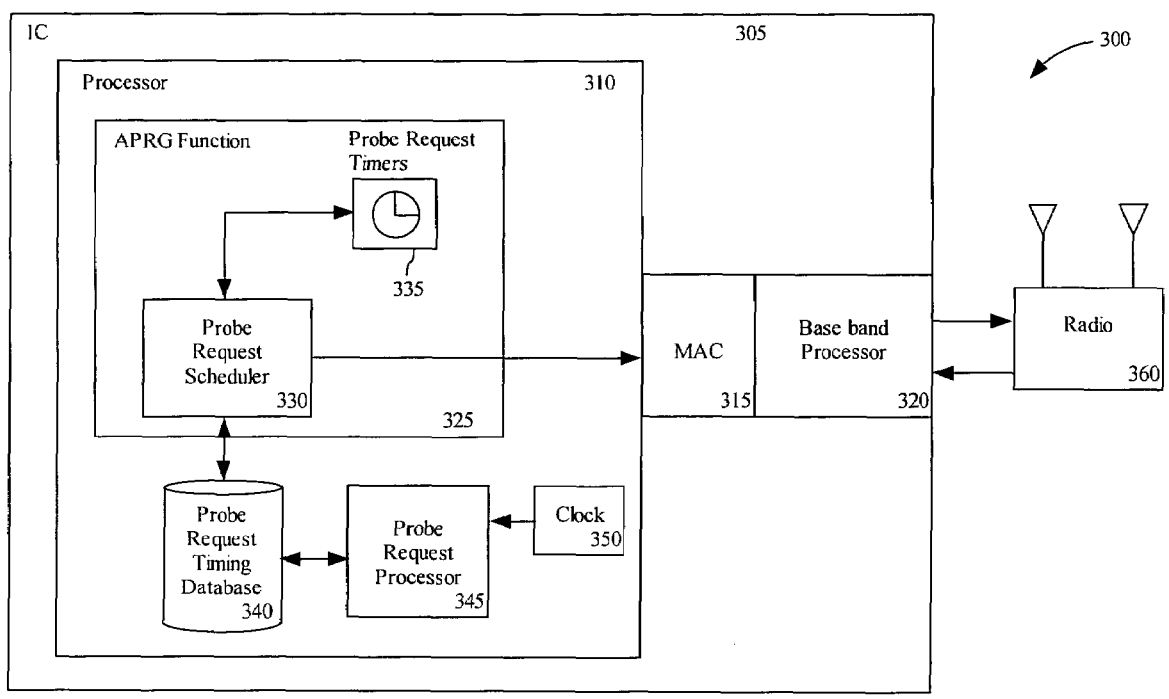
FIG. 3 is an exemplary schematic diagram of an adaptive probe request generator in accordance with the inventive arrangements disclosed herein.

Referring to FIG. 3, an exemplary block diagram of an APRG 300 is shown. As noted, the APRG 300 can be used as the probe request generator. The APRG 300 can comprise a processor 310, a medium access controller (MAC) 315, a baseband processor 320, and a radio 360. The processor 310, the MAC 315, the baseband processor 320, and the radio 360 can be implemented as individual circuit components, or a plurality of the components can be combined into one or more integrated circuits (IC's). For example, the processor 310, the MAC 315, and the baseband processor 320 can be combined into a single IC 305. Moreover, the IC can be an application specific integrated circuit (ASIC).

In operation, RF signals carrying probe requests can be received by the radio 360 and processed by the baseband processor 320 and MAC 315 to extract probe request data from the RF signal. Such signal extraction is known to the skilled artisan. Notably, the MAC 315 can determine when the APRG 300 can access a channel for outbound transmissions and the MAC 315 can parse the received probe request frames.

The APRG 300 also can include software, firmware and/or circuitry for providing an APRG function 325. For example, the software and/or firmware, which can be executable by the processor 310, can provide a probe request scheduler function 330 and probe request timers 335. Further, a probe request timing database 340, a probe request processor 345 and a clock 350 can be provided. The probe request processor 345 can be a function which processes probe requests received from stations. For example, the probe request processor 345 can communicate with clock 350 to generate a time stamp for each of the probe requests that are received by the APRG 300. The probe request timing database 340 can store data correlating to the received probe requests. For instance, the probe request timing database 340 can store time stamps, source MAC addresses, or any other information associated with the probe requests.

The probe request scheduler 330 can communicate with the probe request timing database to retrieve information pertaining to received probe requests. Such information can be useful for determining a probe request transmission schedule. Further, the probe request scheduler 330 can communicate with probe request timers 335 to implement the probe request transmission schedule. For example, if the determined probe request transmission schedule requires that probe requests be transmitted every 500 ms, the timers can be used to measure 500 ms intervals. The probe request scheduler 330 can communicate with MAC 315 at appropriate intervals to generate the probe requests which are to be transmitted.

The software and/or firmware can be provided in one or more data stores (not shown). For example, programmable read only memory (PROM), such as a flash memory device, can be provided to store firmware and/or software within the APRG 300. Nonetheless, the invention is not so limited and other types of storage mediums can be used. For example, the data store can comprise another type of electronic storage medium, such as random access memory (RAM), a magnetic storage medium, an optical storage medium, and/or a magneto-optical storage medium.

Figure 4:
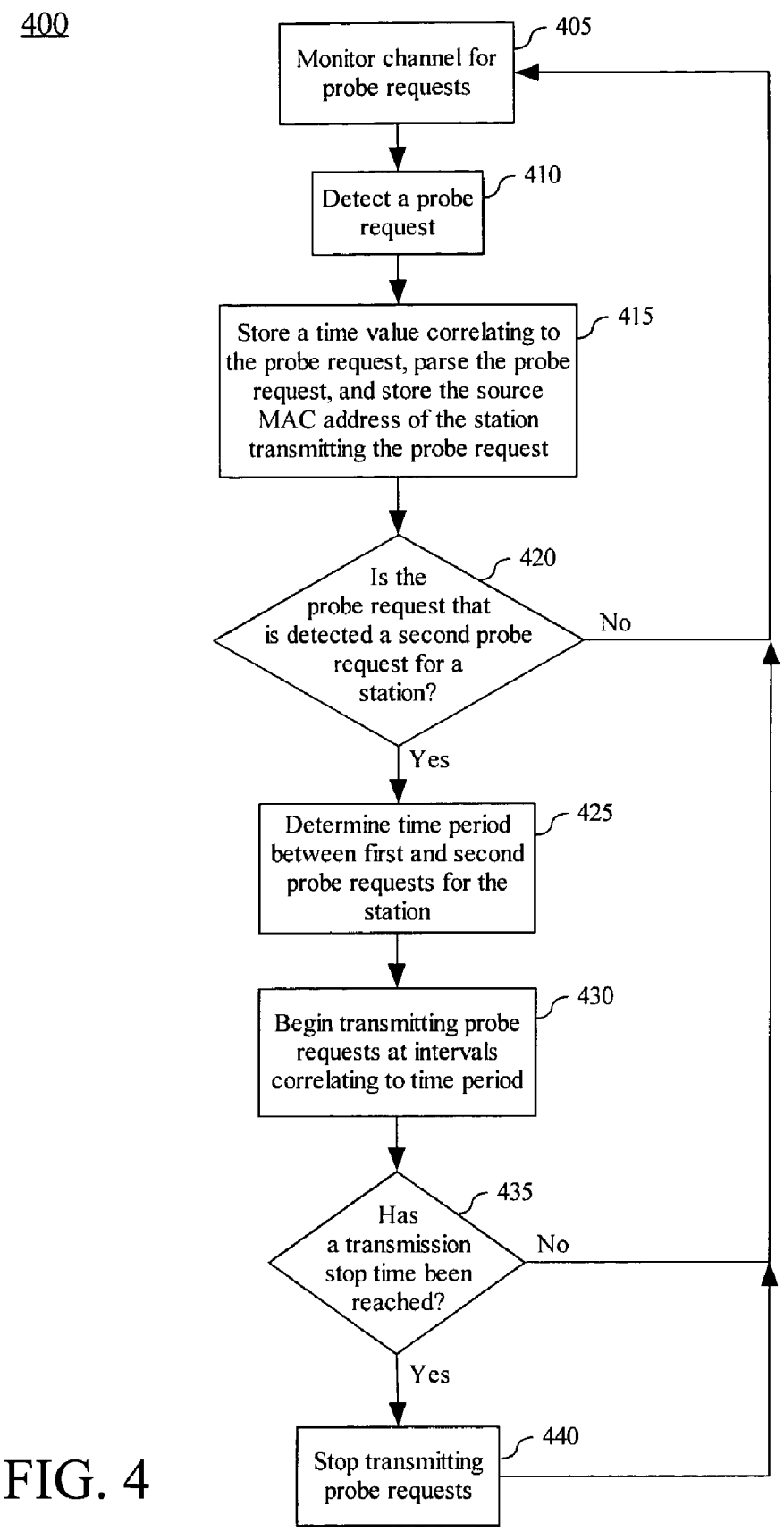
FIG. 4 is a flow chart illustrating a method of using an adaptive probe request generator for signaling a wireless access point to generate probe responses in accordance with the inventive arrangements disclosed herein.

A flow chart illustrating a method 400 of using the APRG to generate probe requests is shown in FIG. 4. Referring to step 405, the APRG can be disposed to continuously monitor the operational channel of the AP for probe requests. Since the APRG can be initially silent, a station entering the operational area of the AP can begin transmitting probe requests. When a probe request from the station is detected, the APRG can store a time value correlating to the detection time, as shown in steps 410 and 415. Further, the APRG can parse the probe request and store the source MAC address of the station transmitting the probe request. For example, the MAC address can be stored in the probe request timing database. Referring to decision box 420, if the detected probe request is not a second probe request received from a particular station, the APRG can continue to monitor the channel. The APRG can utilize the MAC address to identify the station which transmitted the probe request. Thus, if a probe request is transmitted by a second station, that particular probe request will not be associated with the first station. Referring to step 425, if the probe request is a second probe request for a particular station, the APRG can determine the time period between the first and second probe requests transmitted by that station. For example, the probe request processor 345 (of FIG. 3) can compute the time difference. The APRG then can begin transmitting probe requests, sending successive probe requests at time intervals correlating to the determined time period, as shown in step 430. For example, the probe request scheduler 330 can communicate with the probe request timers 335 to schedule transmission of the probe requests. At this point it should be noted that the APRG can detect additional probe requests generated by the station to confirm the time period before the APRG begins transmitting. Moreover, rather than using the first and second probe requests generated by the station to determine the time period, the APRG can utilize any other successive probe requests generated by the station.

Referring to decision box 435 and step 440, the APRG can periodically stop transmitting probe requests to determine if there still are stations in the operational range of the AP which require probe responses. For example, the stations can be predisposed to transmit probe requests when probe responses are no longer being received. Specifically, during a contention process wherein a station contends for a channel on which to transmit, the station can receive packets from the AP and other stations. The station can process the packets and detect probe responses within the packets, if present. If probe responses are detected, the station can listen to the channel at the expected probe response reception times. If probe responses are not detected within the expected probe response reception times, however, the station can begin transmitting probe requests. The APRG can detect such probe requests and then itself resume probe request transmission. The APRG in a sense, can operate as a surrogate for the stations in transmitting probe requests and enables the stations to stop transmitting unnecessary probe requests while the APRG transmits probe requests. In an alternate arrangement, the APRG can continually transmit probe requests to the AP.

In the case that the AP probe response transmission rates lose correlation to desired probe response transmission rates, a station can be configured to temporarily transmit probe requests until the APRG compensates by adjusting the APRG transmission rate of a current series of probe requests. For example, the APRG can be configured to continually monitor probe requests transmitted by stations and periodically determine the time period between the station probe request transmissions. If the newly determined time period does not match a time period currently being used by the APRG for probe request transmissions, the APRG can adjust its transmission rate to the newly determined time period.

Moreover, the APRG also can begin a new series of probe requests. For example, a plurality of probe request series can be generated if a first station and a second station within the operational range of the AP require different probe request intervals. In particular, the APRG can transmit successive probe requests at intervals required by each of the stations. For example, if the first station transmits probe requests at 500 ms intervals and the second station transmits probe requests at 300 ms intervals, the APRG can transmit a first series of probe requests at 500 ms intervals and a second series of probe requests at 300 ms intervals.

Figure 5:
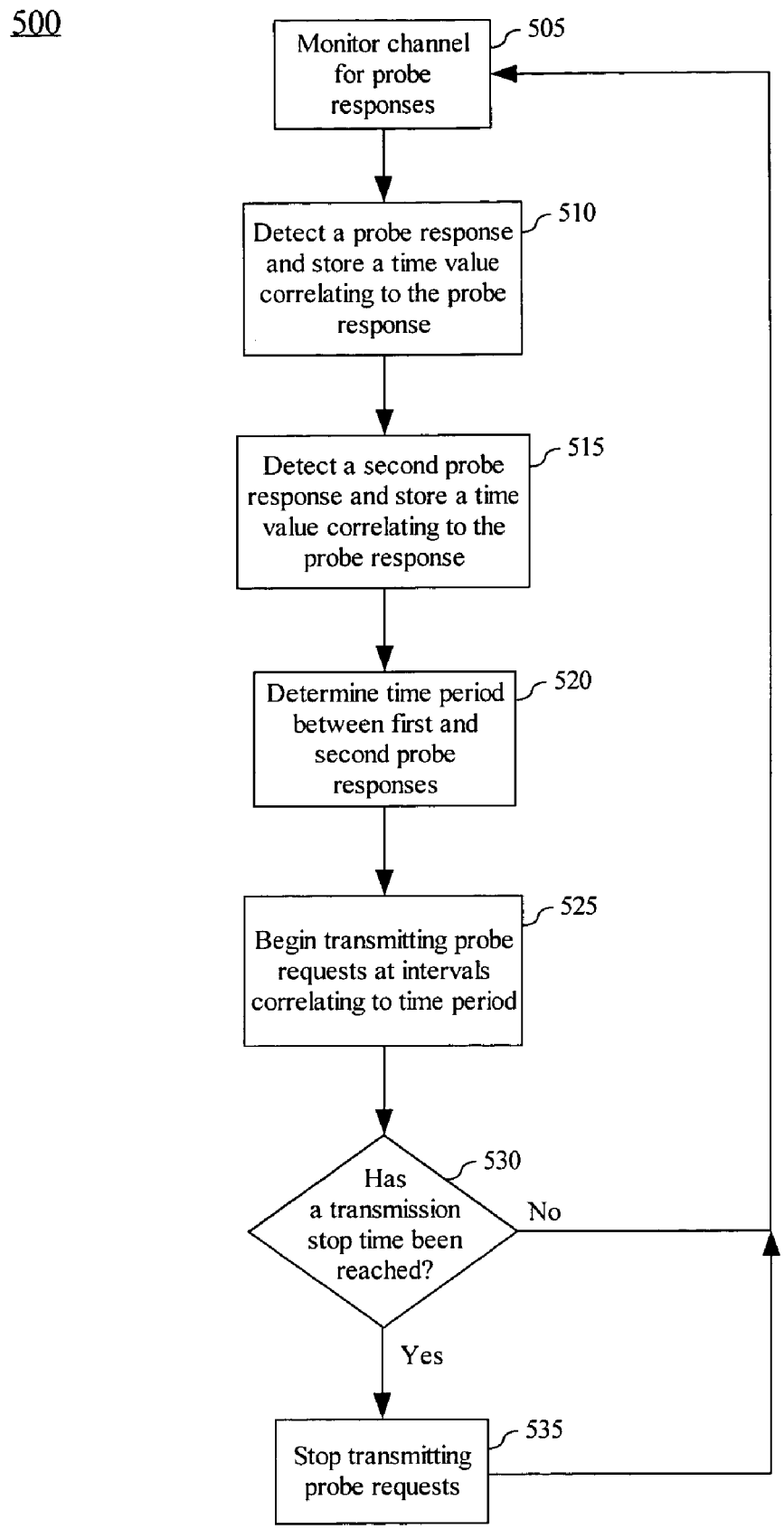
FIG. 5 is a flow chart illustrating an alternate method of using an adaptive probe request generator for signaling a wireless access point to generate probe responses in accordance with the inventive arrangements disclosed herein.

A flow chart illustrating an alternate method 500 of using the APRG to generate probe requests is shown in FIG. 5. Referring to step 505, the APRG can be disposed to continuously monitor the operational channel of the AP for probe responses. Since the APRG can be initially silent, a station entering the operational area of the AP can begin transmitting probe requests to which the AP can reply with probe responses. When a probe response from the AP is detected, the APRG can store a time value correlating to the detection time, as shown in step 510. The APRG then can detect a second probe response and store a correlating time value, as shown in step 515. Proceeding to step 520, the APRG can determine the time period between the first and second probe responses transmitted by the AP. The APRG then can begin transmitting probe requests, sending successive probe requests at time intervals correlating to the determined time period, as shown in step 525. Again, rather than using the first and second probe responses to determine the time period, the APRG can utilize any other successive probe responses generated by the AP. Further, when processing probe responses, the APRG also can store a destination MAC address to assist in the scheduling algorithm.

Referring to decision box 530 and step 535, the APRG can periodically stop transmitting probe requests to determine if there still are stations in the operational range of the AP which require probe responses. For example, the stations can be predisposed to transmit probe requests when probe responses are no longer being received, as previously discussed. The APRG can detect probe responses replying to such probe requests and then resume probe request transmission. In an alternate arrangement, the APRG can continually transmit probe requests to the AP. For example, the APRG can be installed at a particular location and programmed to transmit probe requests at a periodic rate.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

What is claimed is:

1. A method of receiving RF signal quality information comprising the steps of:
   at a first station, receiving a plurality of probe responses transmitted from an access point to the first station over a channel;
   determining a current transmit rate of the probe responses;
   synchronizing signal processing to the current transmit rate of the probe responses; and
   processing the probe responses to determine a signal quality of the channel or a transmission protocol being used over the channel;
   wherein the probe responses are transmitted in reply to probe requests generated by a second station and wherein the probe requests are transmitted from the second station to the access point and the probe requests transmitted from the second station to the access point are based on the timing of probe requests initially transmitted from the first station to the access point.

2. The method of claim 1, further comprising the step of the first station generating a probe request responsive to failing to receive a probe response for a predetermined period of time.

3. The method of claim 1, said synchronizing step further comprising the step of the first station delaying a start of channel monitoring.

4. A method for providing RF signal quality information comprising the steps of:
   from a probe request generator, monitoring a channel for probe requests being transmitted by a station to a first access point;
   determining a time period between successive probe request transmissions from the station to the first access point; and
   from the probe request generator and in response to the probe requests being transmitted from the station to the first access point, transmitting a series of probe requests having the determined time period between successive probe request transmissions;
   wherein the series of probe requests signal the first access point to transmit probe responses which are detectable by the station.

5. The method of claim 4, further comprising the steps of:
   halting the transmission of probe requests from the probe request generator;
   from the probe request generator, monitoring the channel for additional probe requests transmitted from stations other than the probe request generator; and
   continuing the transmission of probe requests from the probe request generator upon detection of additional probe requests.

6. The method of claim 4, wherein said determining a time period step further comprises the step of storing a time value correlating to each of the probe requests.

7. The method of claim 4, further comprising the steps of halting the transmission of probe requests from the station.

8. The method of claim 4, wherein said determining a time period step further comprises the steps of:
   parsing each of the probe requests;
   storing a medium access control address associated with each of the probe requests; and
   identifying the successive probe request transmissions from a particular station with the medium access control address.

9. The method of claim 4, further comprising the steps of:
   from the probe request generator, monitoring the channel for probe requests being transmitted by a second station;
   determining a second time period between successive probe request transmissions from the second station; and
   from the probe request generator, transmitting a second series of probe requests having the second determined time period between successive probe request transmissions;
   wherein the second series of probe requests signal the first access point to transmit probe responses which are detectable by the second station.

10. A method for providing RF signal quality information comprising the steps of:
    from a probe request generator, monitoring a channel for probe responses being transmitted by a first access point to a station;
    determining a time period between successive probe response transmissions; and
    from the probe request generator and in response to the probe responses being transmitted by the first access point to the station, transmitting a plurality of probe requests having the determined time period between successive probe response transmissions;

wherein the probe requests transmitted from the probe request generator signal the first access point to transmit probe responses which are detectable by the station.

11. The method of claim 10, further comprising the steps of:
   halting the transmission of probe requests from the probe request generator;
   from the probe request generator, monitoring the channel for additional probe responses; and
   continuing the transmission of probe requests from the probe request generator upon detection of additional probe responses.

12. The method of claim 10, wherein said determining the time period step further comprises the step of storing a time value correlating to each of the probe responses.

13. A device for generating probe requests comprising:
   a probe request processor which receives probe requests generated by a station for transmission to a first access point and determines a time period between successive probe requests that are received from the station;
   a probe request timing database which stores time stamps associated with the probe requests; and
   a probe request scheduler which schedules probe request transmissions at intervals correlating to the determined time period between the received probe requests;
   wherein the probe request transmissions signal the first access point to transmit probe responses which are detectable by the station.

14. The device for generating probe requests of claim 13, further comprising at least one probe request timer, said probe request timer operatively communicating with said probe request schedule and timing the probe request transmissions.

15. The device for generating probe requests of claim 13, further comprising a clock, said clock operatively communicating with said probe request processor to provide a current time value for each of the received probe requests.

16. The device for generating probe requests of claim 13, further comprising:
   a radio for transmitting and receiving RF signals containing probe requests;
   a baseband processor operatively coupled to said radio; and
   a medium access controller operatively coupled to said baseband processor.

17. A system for synchronizing a radio transceiver to a wireless local area network, comprising:
   a first receiver for receiving a plurality of probe responses over a channel in response to at least one probe request, wherein the probe responses are transmitted from an access point in response to probe requests transmitted from another device to the access point, wherein the probe requests transmitted from the other device to the access point are transmitted based on the timing of probe requests that are initially transmitted from the first receiver to the access point;
   a processor in the radio transceiver operable to:
      initiate a probe request if no probe responses are detected at the first receiver;
      stop further probe requests if probe responses in response to probe requests from the other device are received at the radio receiver; and
      synchronize to the probe requests from the other device or the probe responses transmitted from the access point in response to the probe requests transmitted from the other device.

* * * * *